United States Patent
Song

(10) Patent No.: US 7,259,542 B2
(45) Date of Patent: Aug. 21, 2007

(54) SYSTEM AND METHOD FOR CONTROLLING BIDIRECTIONAL THREE-PHASE DC/DC CONVERTER

(75) Inventor: Hong-Seok Song, Seongnam-si (KR)

(73) Assignee: Hyundai Motor Company, Seocho-ku, Seoul (KR)

( * ) Notice: Subject to any disclaimer, the term of this patent is extended or adjusted under 35 U.S.C. 154(b) by 40 days.

(21) Appl. No.: 11/302,068

(22) Filed: Dec. 12, 2005

(65) Prior Publication Data
US 2006/0139979 A1 Jun. 29, 2006

(30) Foreign Application Priority Data
Dec. 23, 2004 (KR) ............... 10-2004-0111260

(51) Int. Cl.
*G05F 1/56* (2006.01)
(52) U.S. Cl. ............... 323/282; 323/351; 363/78
(58) Field of Classification Search ............... 323/282, 323/283, 351; 363/17, 78, 124
See application file for complete search history.

(56) References Cited

U.S. PATENT DOCUMENTS 7,205,749 B2 * 4/2007 Hagen et al. ............... 323/222

2006/0192537 A1 * 8/2006 Hagen et al. ............... 323/222

FOREIGN PATENT DOCUMENTS

| JP | 09-205774 | 8/1997 |
| JP | 10-201242 | 7/1998 |
| JP | 11-027993 | 1/1999 |
| JP | 2000-134942 | 5/2000 |

* cited by examiner

*Primary Examiner*—Jeffrey Sterrett
(74) *Attorney, Agent, or Firm*—Morgan Lewis & Bockius LLP

(57) ABSTRACT

Disclosed are an apparatus and method for controlling a Direct Current (DC)/DC converter which controls energy flow between a first DC source and a second DC source to eliminate a high-frequency resonance. The apparatus for controlling the DC/DC converter includes a voltage controller, one or more subtractors, one or more fundamental component current controllers, a first coordinate transformer, a resonance current component extractor, a resonance frequency tracker, one or more resonance component current controllers, a second coordinate transformer, one or more adders and a Pulse Width Modulation (PWM) signal generation unit. The method implemented by the apparatus can effectively control any high-frequency resonance current components generated in the DC/DC converter.

15 Claims, 3 Drawing Sheets

SYSTEM AND METHOD FOR CONTROLLING BIDIRECTIONAL THREE-PHASE DC/DC CONVERTER

CROSS-REFERENCE TO RELATED APPLICATIONS

The present application is based on, and claims priority from, Korean Application Serial Number 10-2004-0111260, filed on Dec. 23, 2004, the disclosure of which is hereby incorporated by reference herein in its entirety.

FIELD OF THE INVENTION

The present invention relates to an apparatus and method for controlling a Direct Current (DC)/DC converter.

BACKGROUND OF THE INVENTION

A multi-phase DC/DC converter is a device used in a hybrid electric vehicle or a fuel cell vehicle, etc. The DC/DC converter is responsible for transferring energy between different DC sources bi-directionally or uni-directionally under the control of voltage control logic. The voltage control logic, efficiency and weight of the DC/DC converter are directly related to the gas mileage of a vehicle having the DC/DC converter. Thus, the development of a highly efficient and low weight DC/DC converter is essential for the improvement of the gas mileage of the vehicle.

The weight reduction of the multi-phase DC/DC converter requires the size decrease of inductors and capacitors serving as filters in the DC/DC converter. But small values of the corresponding inductance and capacitance for the filters may cause a high-frequency resonance generated between the inductors and the capacitors, which is difficult to prevent using traditional control methods such as a gain control method. The high-frequency resonance results in a ripple generated in output power and voltage as well as heat generated at the inductors and the capacitors, thereby reducing the DC/DC converter's efficiency. Therefore, there is a need for technologies that can prevent the occurrence of the high-frequency resistance while reducing the size and weight of the multi-phase DC/DC converter.

SUMMARY OF THE INVENTION

In some embodiments of the present invention, an apparatus for controlling a DC/DC converter, which controls energy flow between a first DC source and a second DC source, includes a voltage controller for calculating a current command value for the input current of the second DC source which is used to offset a difference between a voltage command value for the output voltage of the first DC source and the measured output voltage of the first DC source. One or more subtractors calculate differences between the current command value and the measured currents of respective phases of the DC/DC converter. One or more fundamental component current controllers calculate fundamental component control voltage command values of the respective phases of the DC/DC converter which are used to offset the differences between the current command values and currents of the respective phases. A first coordinate transformer transforms the calculated current differences into values in an orthogonal stationary coordinate system. A resonance current component extractor extracts resonance current components from the transformed values in the orthogonal stationary coordinate system. A resonance frequency tracker estimates resonance frequency variation from the extracted resonance current components and feeds back the estimated resonance frequency variation to the resonance current component extractor. One or more resonance component current controllers calculate voltage command values in the orthogonal stationary coordinate system, which are used to offset the extracted resonance current components. A second coordinate transformer calculate resonance component control voltage command values for the respective phases of the DC/DC converter by inversely transforming the calculated voltage command values in the orthogonal stationary coordinate system into coordinate systems corresponding to the respective phases of the DC/DC converter. One or more adders calculate final voltage command values by adding the fundamental component control voltage command values of the respective phases to respective resonance component control voltage command values. A Pulse Width Modulation (PWM) signal generation unit generates a PWM signal for controlling the DC/DC converter based on the final voltage command values.

In some other embodiments of the present invention, a method of controlling a DC/DC converter, which controls energy flow between a first DC source and a second DC source, includes the steps of calculating a current command value for the input current of the second DC source which is used to offset difference between a voltage command value for the output voltage of the first DC source and a measured output voltage of the first DC source; calculating differences between the current command value and the measured currents of respective phases of the DC/DC converter; calculating fundamental component control voltage command values of the respective phases of the DC/DC converter which are used to offset the differences between the current command values and currents of the respective phases; transforming the calculated differences into values in an orthogonal stationary coordinate system; extracting resonance current components from the transformed values in the orthogonal stationary coordinate system using a resonance current component extractor; estimating resonance frequency variation from the extracted resonance current components and feeding back the estimated resonance frequency variation to the resonance current component extractor; calculating voltage command values in the orthogonal stationary coordinate system, which are used to offset the extracted resonance current components; calculating resonance component control voltage command values for the respective phases of the DC/DC converter by inversely transforming the calculated voltage command values in the orthogonal stationary coordinate system into those coordinate systems corresponding to the respective phases of the DC/DC converter; calculating final voltage command values by adding the fundamental component control voltage command values of the respective phases to respective resonance component control voltage command values; and generating a PWM signal for controlling the DC/DC converter based on the final voltage command values.

BRIEF DESCRIPTION OF THE DRAWINGS

For a better understanding of the nature of the present invention, reference should be made to the following detailed description with the accompanying drawings, in which.

DETAILED DESCRIPTION OF THE EMBODIMENTS

Embodiments of the present invention will be described below with reference to the accompanying drawings.

Figure 1:
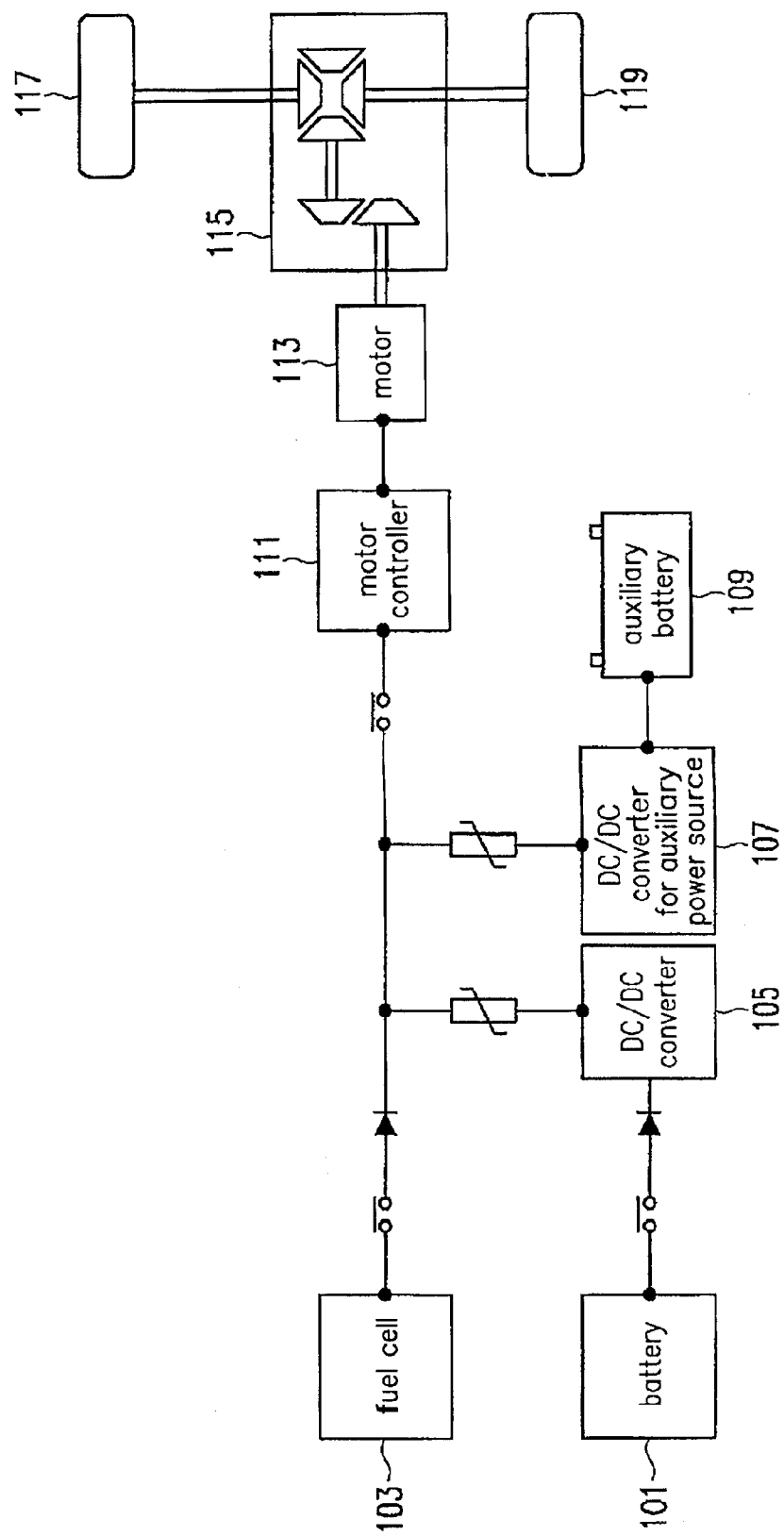
FIG. 1 is a diagram schematically illustrating a power system of an electric vehicle having a DC/DC converter.

Referring to FIG. 1, a bi-directional three-phase DC/DC converter 105 is a component of the power system of a hybrid electric vehicle. The DC/DC converter 105 controls energy flow through DC-DC conversion between different DC sources like a battery 101 and a fuel cell 103. A motor controller 111 controls the operation of a motor 113 using the electric energy of the battery 101 or fuel cell 103. The power generated by the motor 113 passes through a decelerator 115 and is transferred to the wheels 117 and 119 of the vehicle. The power system of the hybrid electric vehicle may further include an auxiliary battery 109, and a DC/DC converter for an auxiliary power source 107, which controls the energy flow of the auxiliary battery 109.

Figure 2:
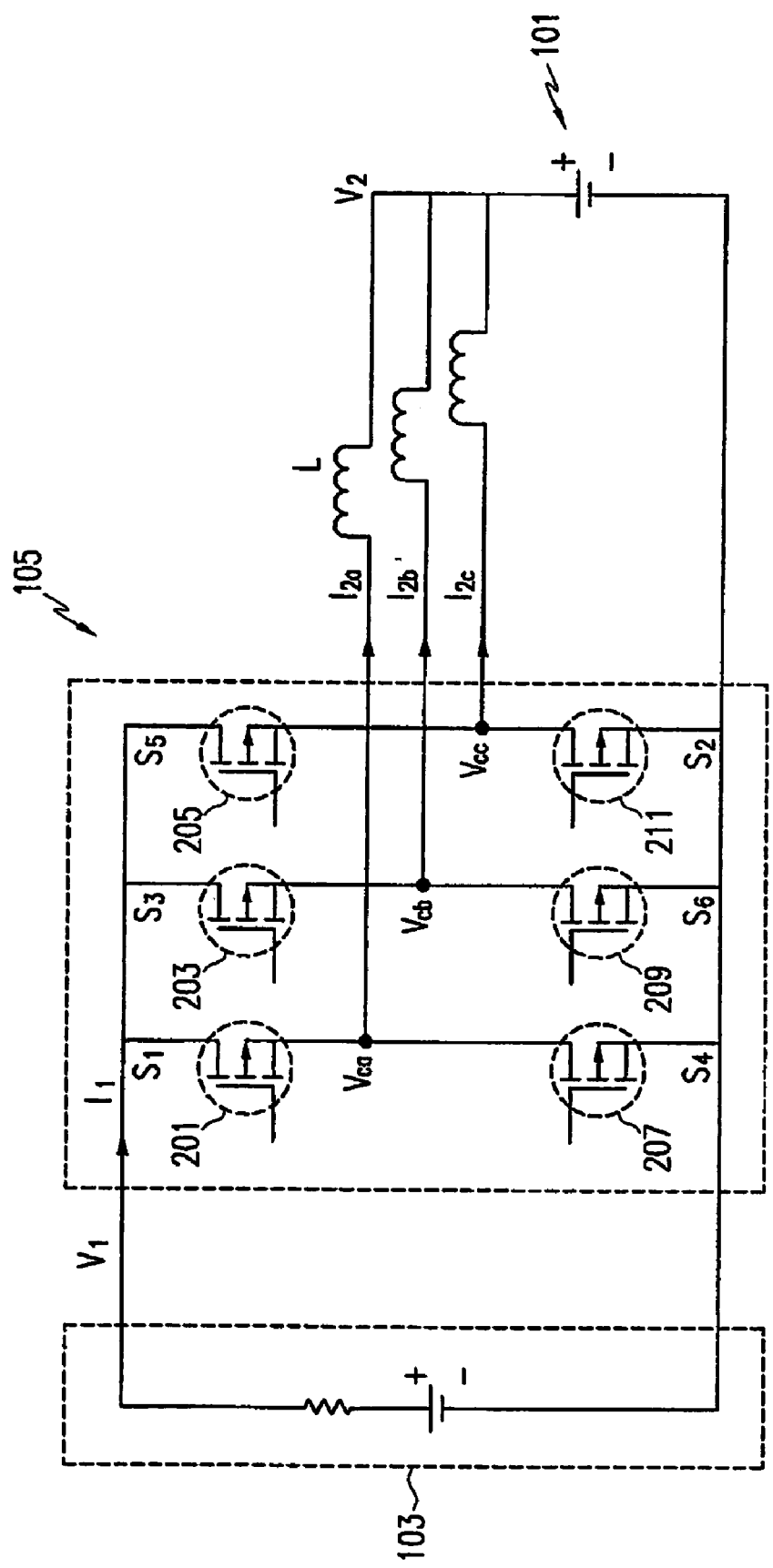
FIG. 2 is a diagram illustrating an example of a bi-directional three-phase DC/DC converter.

As shown in FIG. 2, the DC/DC converter 105 includes a plurality of switching devices 201, 203, 205, 207, 209 and 211 for performing switching operations, and the energy flow between the battery 101 and the fuel cell 103 is controlled by the switching operations of the switching devices 201, 203, 205, 207, 209 and 211. Each of the switching devices 201, 203, 205, 207, 209 and 211 may be a semiconductor power switching device such as a Field Effect Transistor (FET) or an Insulated Gate Bipolar Transistor (IGBT).

Figure 3:
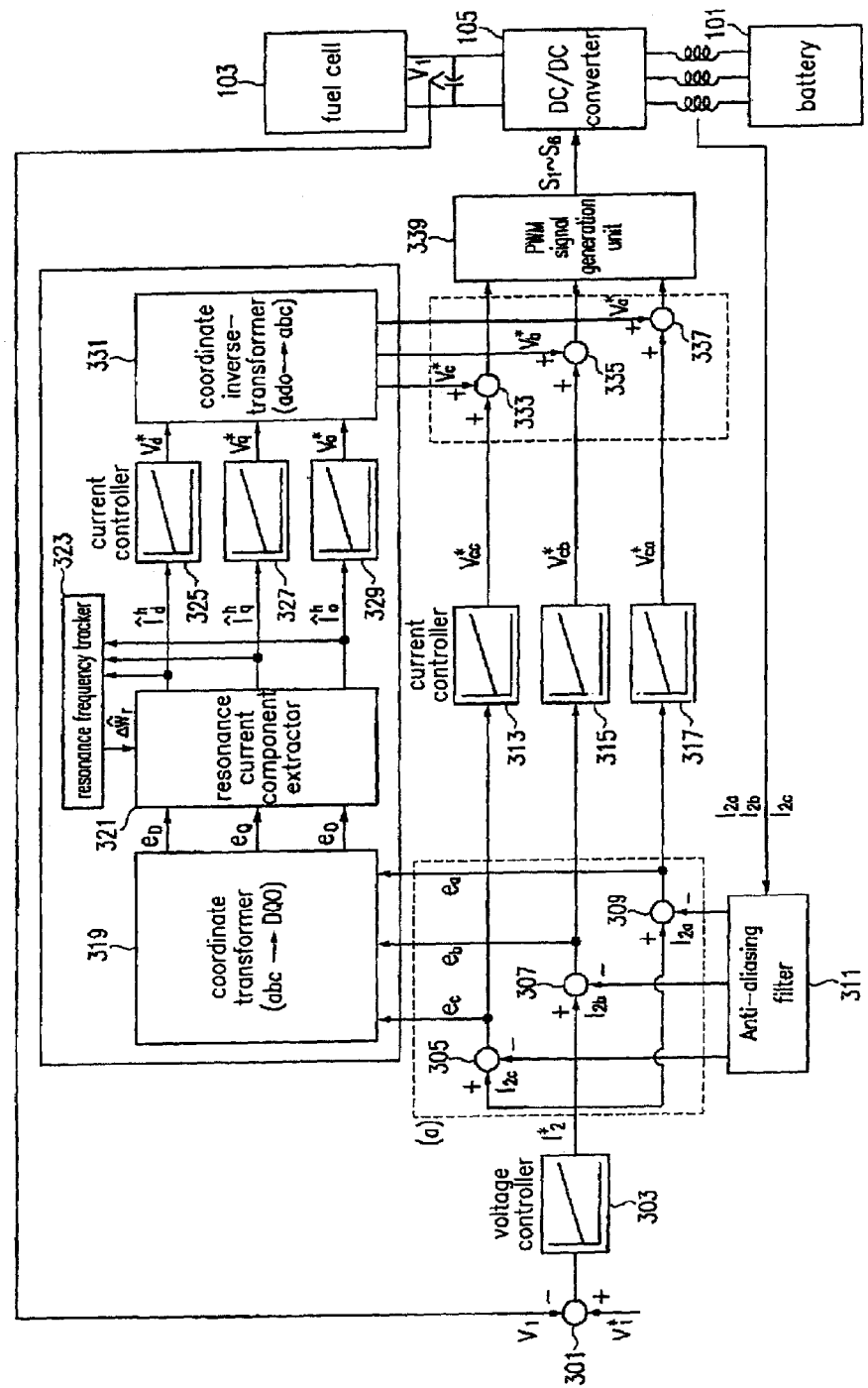
FIG. 3 is a diagram schematically illustrating a control apparatus for a bi-directional three-phase DC/DC converter in accordance with some embodiments of the present invention.

As shown in FIG. 3, according to some embodiment of the present invention, a control apparatus controls the DC/DC converter 105 which transfers energy flow between different DC sources, such as the fuel cell 103 and the battery 101. The control apparatus generates a PWM signal, i.e., a switching signal, and applies the PWM signal to the DC/DC converter 105. A subtractor 301 calculates the difference between a command value V1* for the output voltage of the fuel cell 103 and the measured output voltage V1 of the fuel cell 103.

A voltage controller 303 generates a current command value I2* for the input current of the battery 101, which is used to offset the difference between the command value V1* for the output voltage of the fuel cell 103 and the measured output voltage V1 of the fuel cell 103. For example, the current command value I2* may reduce the difference between the command value V1* and the measured output voltage V1 to zero using a proportional integral controller.

One or more subtractors 305, 307 and 309 respectively calculate the differences between the current command value I2* generated by the voltage controller 303 and the measured currents I2a, I2b and I2c of the respective phases of the DC/DC converter 105. The measured currents I2a, I2b and I2c are the output currents of the respective phases a, b and c of the DC/DC converter 105. They are input to the subtractors 309, 307 and 305 through an anti-aliasing filter 311.

The current command value I2* includes the current command values $I_a^{f*}$, $I_b^{f*}$ and $I_c^{f*}$ of the fundamental wave components of the respective phases. Each of the measured currents I2a, I2b and I2c includes a fundamental wave component and a harmonic component. For example, the measured current I2a of phase a includes an a-phase fundamental wave current component $I_a^f$ and an a-phase harmonic current component $I_a^h$.

The subtractor 309 calculates the difference ea between the a-phase current command value $I_a^{f*}$ and the measured a-phase current I2a, the subtractor 307 calculates the difference eb between the b-phase current command value $I_b^{f*}$ and the measured b-phase current I2b, and the subtractor 305 calculates the difference ec between the c-phase current command value $I_c^{f*}$ and the measured c-phase current I2c.

During this process, the differences between the current command values and the measured currents of the respective phases, are expressed as the following:

$$e_a = (I_a^{f*} - I_a^f) + (0 - I_a^h)$$

$$e_b = (I_b^{f*} - I_b^f) + (0 - I_b^h)$$

$$e_c = (I_c^{f*} - I_c^f) + (0 - I_c^h)$$

One or more fundamental component current controllers 313, 315 and 317 respectively calculate the fundamental component control voltage command values $V_{cc*}$, $V_{cb*}$ and $V_{ca*}$ of the respective phases a, b, and c of the DC/DC converters 105. They are used to offset the differences $e_c$, $e_b$ and $e_a$ between the current command value $I_{2*}$ and the measured currents $I_{2c}$, $I_{2b}$ and $I_{2a}$ of the respective phases of the DC/DC converter 105. In particular, the fundamental component control voltage command values $V_{cc*}$, $V_{cb*}$ and $V_{ca*}$ can help to reduce the differences $e_c$, $e_b$ and $e_a$ to zero using a proportional integral controller.

A coordinate transformer 319 transforms the differences $e_a$, $e_b$ and $e_c$ into values $e_D$, $e_Q$ and $e_O$ in an orthogonal stationary coordinate system (D-Q-O phases) using the following equation:

$$\begin{bmatrix} e_D \\ e_Q \\ e_O \end{bmatrix} = \frac{2}{3} \begin{bmatrix} 1 & -1/2 & -1/20 \\ 0 & \sqrt{3}/2 & -\sqrt{3}/2 \\ 1/2 & 1/2 & 1/2 \end{bmatrix} \begin{bmatrix} e_a \\ e_b \\ e_c \end{bmatrix}$$

A resonance current component extractor 321 extracts resonance current components $\hat{I}_d^h$, $\hat{I}_q^h$ and $\hat{I}_o^h$ from the values $e_D$, $e_Q$ and $e_O$ in the orthogonal stationary coordinate system. For example, the resonance current component extractor 321 can instantaneously extract high frequency resonance current components that correspond to resonance frequencies using a least-squares estimation algorithm without time delay. The least-squares estimation algorithm is constructed based on a time-varying model of a fundamental wave component and a harmonic component to estimate a projected vector in a synchronous coordinate system of each component. Note that the least-squares estimation algorithm is readily understood by those skilled in the art and a detailed description thereof is omitted from the present application.

In some embodiments, the resonance current component extractor 321 can extract the high frequency resonance current component $\hat{x}(t_i)$ using the least-squares estimation algorithm as shown in the following expression:

$$\hat{x}(t_i) = \hat{x}(t_{i-1}) + k(t_i)(y(t_i) - H(t_i)\hat{x}(t_{i-1}))$$

where $$\hat{x}(t_i) = \begin{bmatrix} \hat{i}_d^h \\ \hat{i}_q^h \\ \hat{i}_o^h \end{bmatrix},$$

$$y(t_i) = \begin{bmatrix} e_D \\ e_Q \\ e_O \end{bmatrix} = \begin{bmatrix} -\hat{i}_d^h \cos(\theta(t_i)) + \hat{i}_q^h \sin(\theta(t_i)) \\ -\hat{i}_d^h \cos(\theta(t_i)) - \hat{i}_q^h \sin(\theta(t_i)) \\ -\hat{i}_o^h \end{bmatrix},$$

$$H(t_i) = \begin{bmatrix} -\cos(\theta(t_i)) & \sin(\theta(t_i)) & 0 \\ -\sin(\theta(t_i)) & -\cos(\theta(t_i)) & 0 \\ 0 & 0 & -1 \end{bmatrix},$$

$k(t_i) = P(t_{i-1})H(t_i)^T r(t_i)^{-1}$, $P(t_i) = \lambda^{-1} P(t_{i-1}) - \lambda^{-1} k(t_i) H(t_i) P(t_{i-1})$, $r(t_i) = 1 + H(t_i) P(t_{i-1}) H(t_i)^T$, $\theta(t_i) = \theta(t_{i-1}) + \hat{\omega}_r(t_i) \Delta t$, $\hat{\omega}_r(t_i) = \hat{\omega}_r(t_{i-1}) + \Delta\hat{\omega}_r(t_i)$, $\lambda (\in (0,1))$ is a forgetting factor, $\Delta\hat{\omega}_r$ is resonance frequency variation, and $t_i$ is an i-th time interval.

A resonance frequency tracker 323 tracks the resonance frequency variation using the resonance current components extracted by the resonance current component extractor 321 and feeds it back to the resonance current component extractor 321. In some embodiments, the resonance frequency tracker 323 may directly feed the resonance frequency variation back to the resonance current component extractor 321. In some other embodiments, the resonance frequency tracker 323 may feed back an estimated resonance frequency $\hat{\omega}_r$ to the resonance current component extractor 321, which is calculated using the resonance frequency variation.

The resonance frequency tracker 323 can track the resonance frequency variation $\Delta\hat{\omega}_r$ based on the d-phase and q-phase resonance current components $\hat{i}_d^h$ and $\hat{i}_q^h$ of a synchronous coordinate system using a proportional integral controller. For example, the resonance frequency variation between an (i-1)-th time interval and an i-th time interval is expressed as $$\Delta\hat{\omega}_r(t_i) = \Delta\hat{\omega}_r(t_o) + K_P e(t_i) + K_I \sum_{l=2}^{i} e(t_l)$$

where $e(t) = \hat{\Phi}(t_i) - \hat{\Phi}(t_{i-1})$, $\hat{\Phi}(t_i) = \arctan 2(\hat{i}_q^h(t_i), \hat{i}_d^h(t_i))$, $K_p$ and $K_I$ are gains of the proportional integral controller, and "arctan2(variable, variable)" is a function of calculating the arc tangent values of the two variables and determining a quadrant using the signs of respective variables.

One or more resonance component current controller 325, 327 and 329 generate voltage command values $V_{d*}$, $V_{q*}$ and $V_{o*}$ in the orthogonal stationary coordinate system, which are used to offset the resonance current components $\hat{i}_d^h$, $\hat{i}_q^h$ and $\hat{i}_o^h$ extracted by the resonance current component extractor 321. These voltage command values help to set the resonance current components to zero using a proportional integral controller.

A coordinate inverse-transformer 331 calculates resonance component control voltage command values $V_{a*}$, $V_{b*}$ and $V_{c*}$ of the respective phases a, b, and c of the DC/DC converter 105 by inversely transforming the voltage command values $V_{d*}$, $V_{q*}$ and $V_{o*}$ in the orthogonal stationary coordinate system into those values in the coordinate systems corresponding to the respective phases (phases, a, b and c) of the DC/DC converter 105. Below is an equation used by the coordinate inverse-transformer 331 for calculating the resonance component control voltage command values $V_{a*}$, $V_{b*}$ and $V_{c*}$ of the respective phases of the DC/DC converter 105:

$$\begin{bmatrix} V_{a*} \\ V_{b*} \\ V_{c*} \end{bmatrix} = \begin{bmatrix} 1 & 0 & 1 \\ -1/2 & \sqrt{3}/2 & 1 \\ -1/2 & -\sqrt{3}/2 & 1 \end{bmatrix} \begin{bmatrix} \cos(\hat{\omega}_r t) & -\sin(\hat{\omega}_r t) & 0 \\ \sin(\hat{\omega}_r t) & \cos(\hat{\omega}_r t) & 0 \\ 0 & 0 & 1 \end{bmatrix} \begin{bmatrix} V_{d*} \\ V_{q*} \\ V_{o*} \end{bmatrix}$$

where $\hat{\omega}_r$ is an estimated resonance frequency. As mentioned above, it can be expressed as a function of the resonance frequency variation $\Delta\hat{\omega}_r$, i.e., $\hat{\omega}_r(t_i) = \hat{\omega}_r(t_{i-1}) + \Delta\hat{\omega}_r(t_i)$.

One or more adders 333, 335 and 337 generate the final voltage command values by respectively adding each of the fundamental component control voltage command values $V_{cc*}$, $V_{cb*}$ and $V_{ca*}$ of the respective phases to the resonance component control voltage command values $V_{c*}$, $V_{b*}$ and $V_{a*}$ of the respective phases. Finally, a PWM signal generation unit 339 generates PWM signals to control the DC/DC converter 105 based on the final voltage command values.

In sum, a method of controlling a DC/DC converter according to some embodiments may include the following steps: calculating a current command value for the input current of a second DC source to offset the difference between a voltage command value for the output voltage of a first DC source and a measured output voltage of the first DC source; calculating the differences between the current command value and the measured current of the respective phases of the DC/DC converter; calculating fundamental component control voltage command values of the respective phases of the DC/DC converter which are used to offset the differences between the current command values and currents of the respective phases; transforming the calculated differences into values in an orthogonal stationary coordinate system; extracting resonance current components from the transformed values in the orthogonal stationary coordinate system; estimating resonance frequency variation from the extracted resonance current components and feeding the estimated resonance frequency variation back to the resonance current component extractor; calculating voltage command values in the orthogonal stationary coordinate system, which are used to offset the extracted resonance current components; calculating resonance component control voltage command values of the respective phases of the DC/DC converter by inversely transforming the calculated voltage command values of the orthogonal stationary coordinate system into those of coordinate systems corresponding to the respective phases of the DC/DC converter; calculating final voltage command values by adding the fundamental component control voltage command values of the respective phases to respective resonance component control voltage command values; and generating a PWM signal for controlling the DC/DC converter based on the final voltage command values. This control method may be performed in the control apparatus according to some embodiments of the present invention. The respective steps of the control method are substantially similar to the operations of corresponding elements described above in connection with FIG. 3. The apparatus and method of controlling a multi-phase DC/DC converter according to some embodiments of the present invention can effectively control any resonance current components generated in the converter.

Note that the aforementioned embodiments of the present invention have been disclosed for illustrative purposes. Those skilled in the art will appreciate that various modifications, additions and substitutions are possible, without departing from the scope and spirit of the invention as disclosed in the accompanying claims.

What is claimed is:

1. An apparatus for controlling a Direct Current (DC)/DC converter which controls energy flow between a first DC source and a second DC source, comprising:
   a voltage controller for generating a current command value for an input current of the second DC source;
   one or more subtractors for generating differences between the current command value and measured currents of respective phases of the DC/DC converter;
   one or more fundamental component current controllers for generating fundamental component control voltage command values of the respective phases of the DC/DC converter;
   a first coordinate transformer for transforming the generated differences into values in an orthogonal stationary coordinate system;
   a resonance current component extractor for extracting resonance current components from the transformed values in the orthogonal stationary coordinate system;
   a resonance frequency tracker for estimating resonance frequency variation from the extracted resonance current components and feeding the estimated resonance frequency variation back to the resonance current component extractor;
   one or more resonance component current controllers for generating voltage command values in the orthogonal stationary coordinate system;
   a second coordinate transformer for generating resonance component control voltage command values for the respective phases of the DC/DC converter using the voltage command values in the orthogonal stationary coordinate system;
   one or more adders for generating final voltage command values by adding each of the fundamental component control voltage command values of the respective phases to each of the corresponding resonance component control voltage command values; and
   a Pulse Width Modulation (PWM) signal generation unit for generating a PWM signal for controlling the DC/DC converter based on the final voltage command values.

2. The apparatus of claim 1, wherein the current command value for the input current of the second DC source is used for offsetting a difference between a voltage command value for an output voltage of the first DC source and a measured output voltage of the first DC source.

3. The apparatus of claim 1, wherein the fundamental component control voltage command values are used for offsetting the differences between the current command values and measured currents of the respective phases of the DC/DC converter.

4. The apparatus of claim 1, wherein the voltage command values in the orthogonal stationary coordinate system are used for offsetting the extracted resonance current components.

5. The apparatus of claim 1, wherein the voltage command values in the orthogonal stationary coordinate system are inversely transformed into the resonance component control voltage command values in coordinate systems corresponding to the respective phases of the DC/DC converter.

6. A method of controlling a DC/DC converter which controls energy flow between a first DC source and a second DC source, comprising:
   generating a current command value for an input current of the second DC source;
   generating differences between the current command value and measured currents of respective phases of the DC/DC converter;
   generating fundamental component control voltage command values of the respective phases of the DC/DC converter;
   transforming the differences between the current command value and measured currents of respective phases of the DC/DC converter into values in an orthogonal stationary coordinate system;
   extracting resonance current components from the transformed values in the orthogonal stationary coordinate system using a resonance current component extractor;
   estimating resonance frequency variation from the extracted resonance current components and feeding the estimated resonance frequency variation back to the resonance current component extractor;
   generating voltage command values in the orthogonal stationary coordinate system;
   generating resonance component control voltage command values for the respective phases of the DC/DC converter using the voltage command values in the orthogonal stationary coordinate system;
   generating final voltage command values by adding the fundamental component control voltage command values of the respective phases to the respective resonance component control voltage command values; and
   applying a PWM signal to the DC/DC converter, the PWM signal being based on the final voltage command values.

7. The method of claim 6, wherein the current command value for the input current of the second DC source is used for offsetting a difference between a voltage command value for an output voltage of the first DC source and a measured output voltage of the first DC source.

8. The method of claim 6, wherein the fundamental component control voltage command values of the respective phases of the DC/DC converter are used for offsetting the differences between the current command values and currents of the respective phases.

9. The method of claim 6, wherein the voltage command values in the orthogonal stationary coordinate system are used for offsetting the extracted resonance current components.

10. The method of claim 6, wherein the voltage command values in the orthogonal stationary coordinate system are inversely transformed into the resonance component control voltage command values in coordinate systems corresponding to the respective phases of the DC/DC converter.

11. An apparatus for controlling a Direct Current (DC)/DC converter which controls energy flow between a first DC source and a second DC source, comprising:

means for generating a current command value for an input current of the second DC source;

means for generating differences between the current command value and measured currents of respective phases of the DC/DC converter;

means for generating fundamental component control voltage command values of the respective phases of the DC/DC converter;

means for transforming the generated differences into values in an orthogonal stationary coordinate system;

means for extracting resonance current components from the transformed values in the orthogonal stationary coordinate system;

means for estimating resonance frequency variation from the extracted resonance current components and feeding the estimated resonance frequency variation back to the means for extracting resonance current components;

means for generating voltage command values in the orthogonal stationary coordinate system;

means for generating resonance component control voltage command values for the respective phases of the DC/DC converter using the voltage command values in the orthogonal stationary coordinate system;

means for generating final voltage command values by adding each of the fundamental component control voltage command values of the respective phases to each of the corresponding resonance component control voltage command values; and means for generating a PWM signal for controlling the DC/DC converter based on the final voltage command values.

12. The apparatus of claim 11, wherein the current command value for the input current of the second DC source is used for offsetting a difference between a voltage command value for an output voltage of the first DC source and a measured output voltage of the first DC source.

13. The apparatus of claim 11, wherein the fundamental component control voltage command values are used for offsetting the differences between the current command values and measured currents of the respective phases of the DC/DC converter.

14. The apparatus of claim 11, wherein the voltage command values in the orthogonal stationary coordinate system are used for offsetting the extracted resonance current components.

15. The apparatus of claim 11, wherein the voltage command values in the orthogonal stationary coordinate system are inversely transformed into the resonance component control voltage command values in coordinate systems corresponding to the respective phases of the DC/DC converter.

* * * * *